United States Patent [19] [11] 3,971,511
Casey [45] July 27, 1976

[54] CABIN HEATER FOR HELICOPTERS AND FIXED WING AIRCRAFT

[76] Inventor: Anthony Joseph Casey, 5029 Perron St., Pierrefonds, Quebec, Canada, H8Z 2J2

[22] Filed: Apr. 16, 1975

[21] Appl. No.: 568,420

[52] U.S. Cl. .............................. 237/12.3 A; 165/52; 244/118 P
[51] Int. Cl.² .......................................... B60H 1/06
[58] Field of Search ............ 237/12.3 A; 244/118 P; 165/52

[56] References Cited
UNITED STATES PATENTS
2,341,549  2/1944  Helmick .......................... 237/12.3 A
2,617,633  11/1952  van den Bosch ...................... 165/52
3,825,212  7/1974  Darges et al. .................... 244/118 P Primary Examiner—William E. Wayner
Assistant Examiner—William E. Tapolcai, Jr.
Attorney, Agent, or Firm—Larson, Taylor & Hinds

[57] ABSTRACT

A flight deck and cabin heater for rotary and fixed wing aircraft driven by a gas turbine engine, including an air heating chamber located above the exhaust section of the engine and having ram air intake to the air chamber and heated air discharge from the air heating chamber to the flight deck and cabin together with valve means to control the intake of air to the air heating chamber, valve means to control the flow of heated air to the flight deck and cabin and recirculation of cabin air, and further valve means to dump heated air, all under the control of the aircraft operator taking into account the temperature of the air outside the aircraft.

7 Claims, 7 Drawing Figures

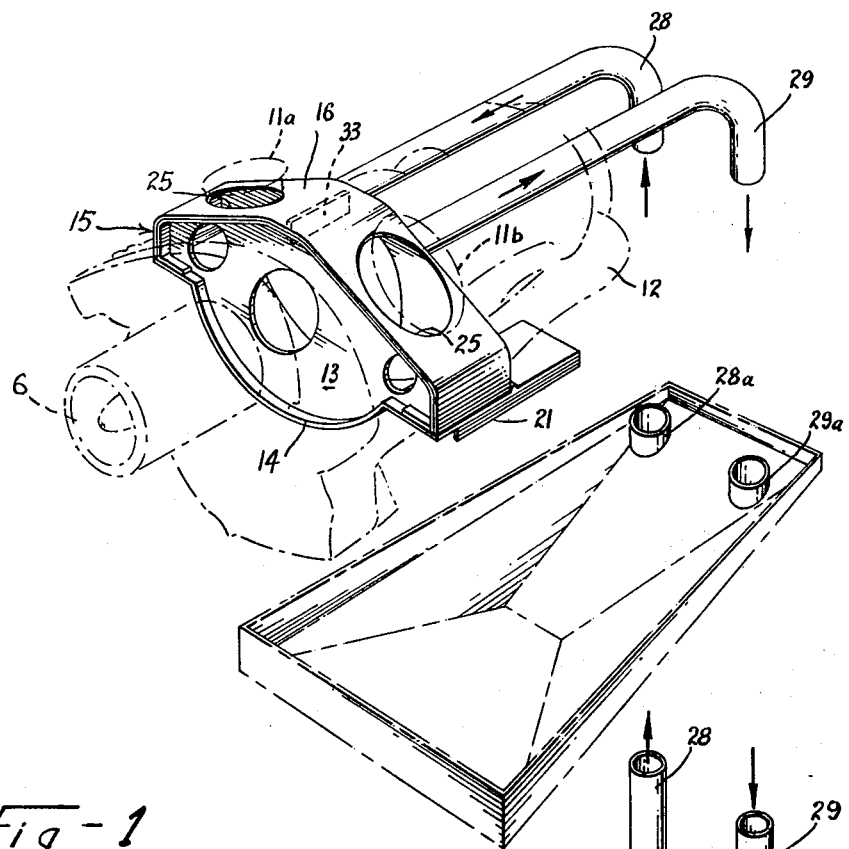
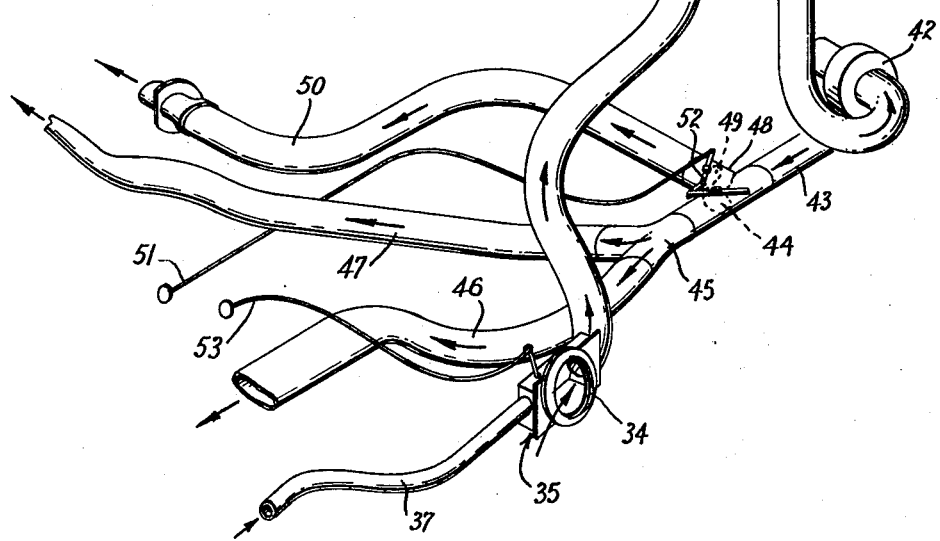
Fig-1

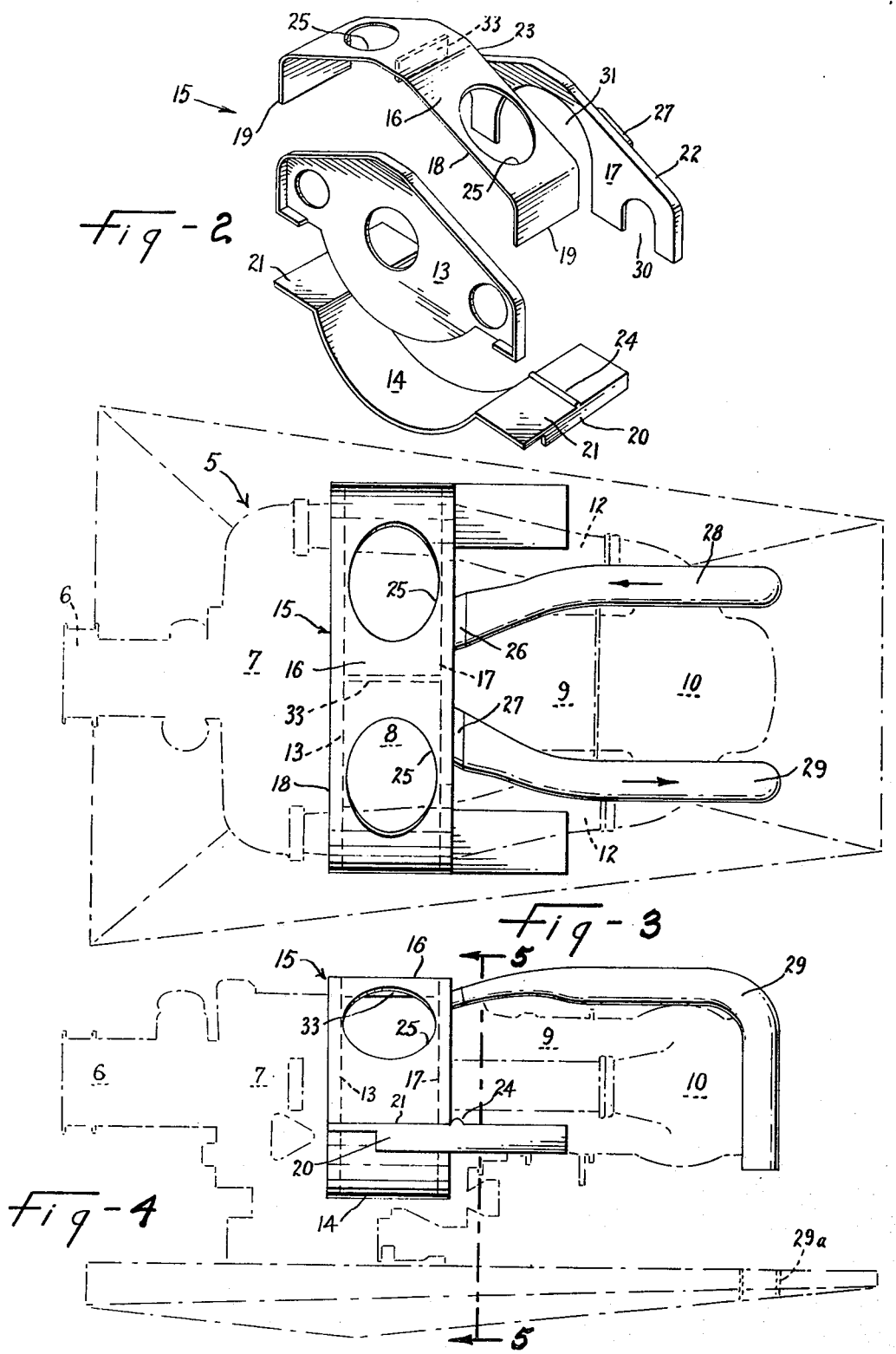

CABIN HEATER FOR HELICOPTERS AND FIXED WING AIRCRAFT

This invention relates to rotary and fixed wing aircraft and particularly to such aircraft driven by gas turbine engines. In particular, the invention relates to the utilization of the heat generated at the exhaust section of the engine for heating the flight deck and cabin spaces of aircraft.

It has been known to utilize the heat from exhaust manifolds of cylinder block type engines and to distribute the heat to the interior of automobiles and the cabin of aircraft.

However, where rotary wing aircraft are equipped with gas turbine engines, the exhaust gases from the engine are directed outwards from the aircraft to atmosphere in the shortest possible distance. It has not been possible, up to the present time, to find a practicable method of utilizing the heat from these exhaust gases for heating the flight deck and cabin spaces of the aircraft. It has been the practice, in rotary wing and small aircraft using a gas turbine engine, to bleed a portion of the air from the compressor of the engine and to mix this air with air from the outside of the aircraft to provide a satisfactory circulation of air to the cabin of the aircraft at a suitable temperature. However, in helicopters and in smaller aircraft driven by gas turbine engines, the engine invariably does not have the capacity to permit the bleeding of air from the compressor of the engine for cabin heating purposes without reducing the efficiency of the engine.

It has also been known to install a separate combustion heater for cabin heating purposes. Such heaters require a separate fuel supply and the heater assembly adds considerably to the deadweight of the aircraft. Thus, in addition to using extra fuel for their operation, they have the effect of cutting down on the payload capacity of the aircraft.

A further drawback in utilizing the combustion heater in helicopters and small aircraft is the high failure rate, under extreme cold temperatures of the heater electric safety devices, which prevents the heater from functioning and deprives the flight crew and passengers of heat and, under certain conditions in flight can cause frost to form on windows and thus lead to forced landings or aborted flights.

In the present invention, in which rotary wing and small aircraft are fitted with a gas turbine engine, the exhaust section of the engine is provided with an external annular chamber encompassing the exhaust discharge outlets from the engine. Air from the atmosphere received into the aircraft through a scoop attached to the airframe is directed to the annular chamber where it is heated and thence directed into the flight deck and the cabin of the aircraft under control of the aircraft operator.

The air intake through the scoop is controlled by an inlet valve to either admit a full quantity of air or a restricted quantity, depending on the outside air temperature. The air passing the inlet valve is directed through a pipe to one side of the annular chamber and about the exhaust section of the engine, and from the other side of the chamber to a blower. The air discharged from the blower is either directed to the flight deck and cabin or discharged overboard through a dump valve. The return flow of air from the aircraft cabin is recirculated through the system only when the air inlet valve is positioned to allow a restricted inflow of fresh air from the scoop into the system.

The primary object of the invention is to utilize the heat from the exhaust section of a gas turbine engine to heat fresh air and recycled air for the purpose of heating the cabin space in rotary wing type aircraft or fixed wing aircraft.

A further object of the invention is to utilize the heat from the exhaust section of a gas turbine engine and to circulate the heated air under the control of the aircraft operator, with the engine running.

A further object of the invention is to provide a lightweight and reliable cabin air heater for rotary and fixed wing aircraft without the addition of any appreciable deadweight, fuel consumption or horsepower penalty to engine.

A further object of the invention is to utilize existing firewall construction about a gas turbine engine for part of an air heating chamber located about the exhaust section of the engine.

These and other objects of the invention will be apparent from the following detailed specification and the accompanying drawings in which:

FIG. 1 is an expanded schematic view of an aircraft cabin air heating system utilizing the heat of the exhaust section of a gas turbine engine, according to the present invention.

FIG. 2 is an expanded schematic view of the shroud elements forming the air heating chamber of the installation shown in FIG. 1.

FIG. 3 is a plan view of the air heating chamber, the air inlet, and the air discharge pipe connections.

FIG. 4 is a side elevation of the structure shown in FIG. 3.

Figure 5:
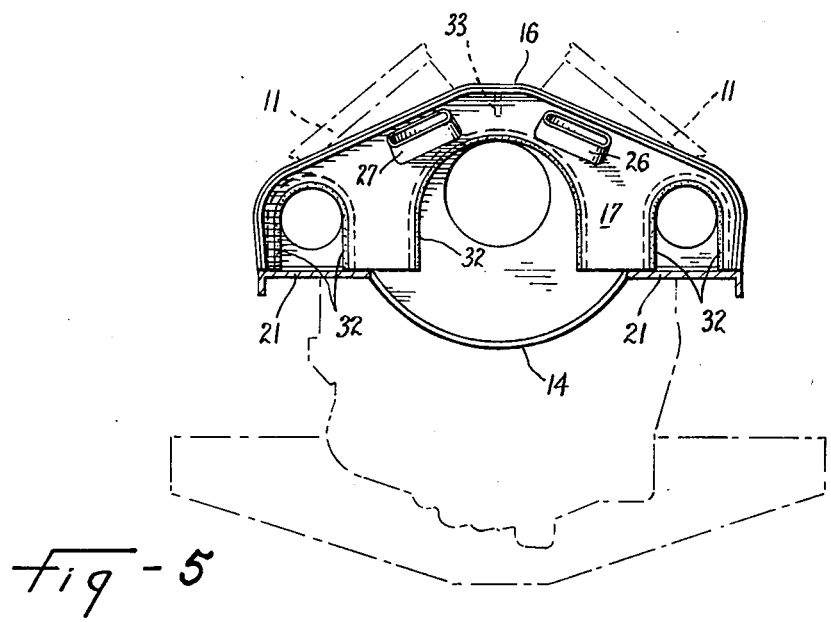
FIG. 5 is a rear end view of the structure shown in FIGS. 3 and 4.

Referring to the drawings and particularly to FIGS. 2, 3, 4 and 5, the gas turbine engine 5, shown in outline, is typical of the type of engine used in the operation of some forms of rotary wing and fixed wing aircraft and includes the air inlet 6, compressor 7, exhaust section 8, turbine section 9, and combustion chamber 10. The discharge of combustion gases from the exhaust section 8 of the engine is through the outlets 11. The flow of air under pressure from the compressor 7 to the combustion chamber 10 is through the conduits 12.

The forward end of the exhaust section 8 of the engine is provided with a firewall 13, and a bottom firewall 14 is located under and about the lower portion of the exhaust section 8. Both firewalls 13 and 14 are generally existing on the engine 5.

An air heating chamber 15 includes the existing firewalls 13 and 14 and is completed by a top and side member 16 and a rear member 17. The forward edge 18 of the top and side member 16 is secured to the adjacent edges of the forward firewall 13, while the lower side edges 19 are secured to the adjacent edges 20 of the outwardly extending flanges 21 of the bottom firewall 14. The upper and side edges 22 of the rear member 17 are secured to the rearward facing edges 23 of the top and side member 16 and rest against the ridge 24 on the upward facing surfaces of the flanges 21 of the bottom firewall 14.

The top and side member 16 is provided with cutouts 25, through which the exhaust outlets 11 of the engine pass while the rear member 17 is provided with a pair of outwardly projecting flange members 26 and 27 to which the air inlet and air outlet pipes 28 and 29 respectively are connected to the air heating chamber 15. As illustrated in FIG. 1, the pipes 28 and 29 are attached to the short tubular members 28a and 29a in the drip pan of the engine.

The rear member 17 of the air chamber is also provided with a pair of cutouts 30 through which the conduits 12 pass, and also a cutout 31 to encircle the upper half of the turbine section 9 of the engine.

All openings and cutouts in the air heating chamber 15 are provided with suitable sealing means 32 at their edges in contact with adjacent surfaces of the engine to prevent leakage of heated air from the chamber.

The air heating chamber 15 thus provides an air space around the body of the exhaust section 8 of the engine, and a central longitudinal baffle 33 extending downwards from the top and side wall member 16 to the body of the exhaust section 8 of the engine prevents short circuiting of the flow of air between the flange members 26 and 27, thus ensuring that the air flow within the chamber will be from the inlet at the flange member 26, about the lower portion of the exhaust section 8 and thence to the outlet at the flange member 27.

Figure 6:
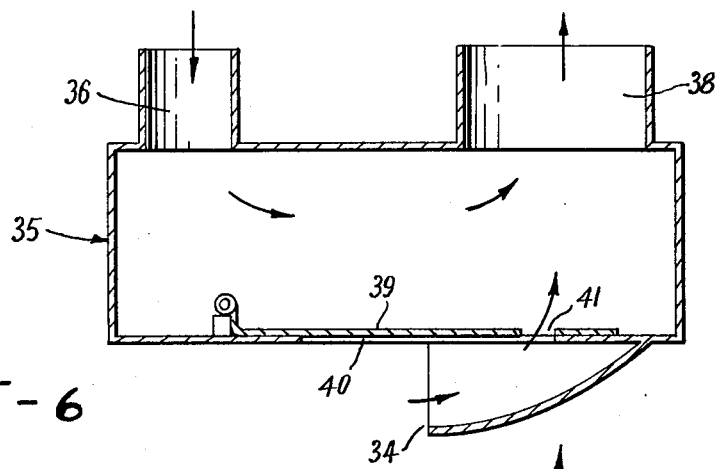
FIG. 6 is a horizontal sectional view of the air inlet scoop showing the control valve in position restricting the inflow of fresh air through the inlet scoop and permitting recycling of the cabin air to the air heating chamber.
Figure 7:
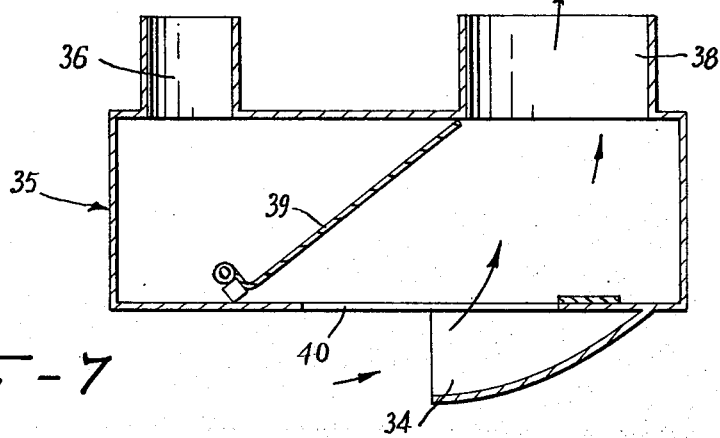
FIG. 7 is a view similar to FIG. 6, but showing the control valve permitting full flow of fresh air through the inlet scoop to the air heating chamber and closing off recycling of the air from the aircraft cabin.

Referring now more particularly to FIGS. 1, 6 and 7 of the drawings and the system by which air is circulated from the atmosphere to the air heating chamber 15 and to the cabin spaces of the aircraft, air is drawn into the system through the air scoop 34 located at any convenient location on the body of the aircraft. Attached to the rear of the air scoop 34 is a valve control box 35 shown in detail in FIGS. 6 and 7. This box 35 has an inlet 36 for the return of air through the pipe connection 37 from the cabin of the aircraft, and an outlet 38 from which air is directed to the air heating chamber 15 through the pipe connection 28.

A flap valve 39, within the valve control box 35, in one position closes off the greater area of the fresh air inlet opening 40 at the scoop 34, leaving a restricted area opening 41 to permit a restricted flow of air to the outlet 38 and through the pipe 28 to the air heating chamber 15 when the valve is in the position shown in FIG. 6. At the same time, a full flow of air from the cabin of the aircraft is permitted to flow from the pipe connection 37 and through the inlet 36 through the valve box 35 to the outlet 38 for recycling of cabin air through the air heating chamber 15.

The flap valve 39 in the other position, shown in FIG. 7, permits a full flow of fresh air from the atmosphere through the scoop 34 and valve box inlet 40 to flow through the outlet 38 and pipe 28 to the air heating chamber 15 while blocking off completely the recycling of air from the cabin spaces of the aircraft.

The air heated within the air heating chamber 15 passes around the bottom portion of the engine exhaust section 8 to the outlet 27 and through the pipe 29 to the blower 42 and to the pipe 43 and valve 44, thence through the Y connection 45 and through the pipe connections 46 and 47 to the cabin spaces of the aircraft.

A branch 48 in the pipe 43 is provided with a valve 49 which, when opened, allows the heated air to be discharged outboard of the aircraft through the pipe connection 50.

The valves 44 and 49 are controlled by the operator of the aircraft through the cable connection 51 and are linked together through the linkage 52. These two valves 44 and 49 are set so that when the valve 44 is open, permitting a flow of conditioned air to the cabin of the aircraft, the valve 49 is closed and, when the valve 49 is opened to permit dumping of conditioned air outboard of the aircraft, the valve 44 is closed allowing no conditioned air to flow to the cabin of the aircraft.

By controlling the setting of the valves 44 and 49, the flow of air to the cabin and discharge of air overboard can be adjusted to a degree for greatest comfort within the cabin.

Control of the valve 39 is by means of the cable 53. Both cables 51 and 52 are under the control of the aircraft operator.

Suitable instrumentation, not shown, within the flight deck of the aircraft permits the operator to monitor the temperature flow of air through the system and to control the temperature and flow of air, depending on the outside air temperature whether the aircraft is in flight, or hovering, or is on the ground with the engine running.

In the operation of this invention, when the aircraft engine is operating and blower 42 running, the valve 39 is positioned as shown in FIG. 7 depending on the outside air temperature so that there is no recycling of cabin air through the air heating chamber 15. The air entering the aircraft through the scoop 34 is directed through the pipe 28 into the air heating chamber 15 to one side of the baffle 33 and passes around the exhaust outlet 11a and around the lower portion of the exhaust section 8 of the engine and past the exhaust outlet 11b and through the pipe 29 to the blower 42.

From the blower 42, the air flows into the pipe 43 past the open valve 49 and thence is discharged overboard through the pipe 50. When the valve 49 is in the open position, the valve 44 is closed until heat is required in the flight deck and cabin. The valves 44 and 49 are maintained in these positions until heat is required in the flight deck and cabin. When heat is required in the flight deck and cabin the operator will reverse or partially reverse the position of the valves 44 and 49 to permit a proportioned flow of heated air to the cabin. Alternatively, when the outside air temperature is so low and more heat is desired, the valve 39 can be moved to the position shown in FIG. 6 where the valve 39 restricts the inflow of fresh air through the scoop 34 and the cabin air is permitted to be recycled through the air heating chamber 15 together with a portion of fresh air. In this condition valve 49 will be closed and valve 44 will be open.

When the aircraft is hovering or in flight, the operator can adjust the valves 39, 44 and 49 to control the flow of air through the system in such a manner that air temperature within the cabin is maintained at a uniform level, regardless of the outside temperature.

The embodiments of the invention in which an exclusive property or privilege is claimed are defined as follows:

1. A cabin air heating system for rotary and fixed wing aircraft in which the aircraft is driven by a gas turbine engine, in combination, a gas turbine engine having an exhaust discharge section, and air heating chamber about the exhaust discharge section of the engine, duct means to circulate fresh air from without the aircraft and recycled cabin air through the air heating chamber and to the cabin of the aircraft, a first valve means located within a valve box having a fresh air inlet, an air inlet from the cabin of the aircraft and an air outlet to said heating chamber to permit fresh air and recycled cabin air to pass through the air heating chamber when the aircraft is in flight or on the ground with the engine running, the first valve means in one position closing off the cabin air inlet to the valve box and permitting a full flow of fresh air to the air heating chamber, and in another position permitting a restricted inflow of fresh air and a full flow of air from the cabin through the valve box to the air heating chamber, and a second valve means to effect discharge of heated air to the atmosphere when the aircraft is in flight or on the ground with the engine running.

2. A cabin air heating system as set forth in claim 1 in which a top and side wall member of the air heating chamber has a central baffle between it and the body of the engine and is provided with a pair of openings located on opposite sides of the said baffle through which exhaust ducts from the engine pass and the air inlet to and the air outlet from the air heating chamber are also located on opposite sides of the said baffle.

3. A cabin air heating system as set forth in claim 2 in which the said air heating chamber extends transversely of the engine and encompasses ducts carrying pressure air between the compressor and the combustion chamber of the gas turbine engine.

4. A cabin air heating system as set forth in claim 1 in which the said second valve means includes a pair of valves, one of said valves controlling the flow of air to the cabin of the aircraft and a second of said pair of valves controlling the discharge of air outboard of the aircraft, and a single control means for said pair of valves operate to open one valve and close the other.

5. A cabin air heater as set forth in claim 1 in which the fresh air inlet to the valve box is located on an outer facing wall of the box and an air scoop is located on the said outer facing wall adjacent to the opening in the said wall, the said scoop directing fresh air into the said box.

6. A cabin air heater as set forth in claim 5 in which the said first valve means is located and operable within the said valve box between the entry to the box of cabin air and the fresh air inlet to the box.

7. A cabin air heater as set forth in claim 6 in which the said first valve means is in the form of a pivoted flap, the said flap valve, when in position adjacent to the said fresh air inlet, covers a large proportion of the area of the said fresh air inlet, leaving a small proportion of the area of the inlet uncovered to permit a continuous but restricted flow of fresh air into the valve box.

* * * * *